(12) United States Patent
Huang

(10) Patent No.: US 8,588,355 B2
(45) Date of Patent: Nov. 19, 2013

(54) TIMING RECOVERY CONTROLLER AND OPERATION METHOD THEREOF

(75) Inventor: Kung-Piao Huang, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 414 days.

(21) Appl. No.: 12/851,564

(22) Filed: Aug. 6, 2010

(65) Prior Publication Data
US 2011/0299643 A1   Dec. 8, 2011

(30) Foreign Application Priority Data
Jun. 2, 2010   (TW) .................................... 99117833

(51) Int. Cl.
*H04L 7/00* (2006.01)
*H04L 25/00* (2006.01)
*H04L 25/40* (2006.01)

(52) U.S. Cl.
USPC ........... 375/371; 375/373; 375/376; 375/326; 713/400; 713/401; 713/500; 713/503; 713/600; 370/516; 370/517; 370/519

(58) Field of Classification Search
USPC .......... 375/371, 373, 376, 326; 713/400, 401, 713/500, 502, 503, 600; 370/516, 517, 519
See application file for complete search history.

(56) References Cited

U.S. PATENT DOCUMENTS

| 6,512,473 | B2 * | 1/2003 | Sasaki ........................... 341/159 |
| 2005/0031065 | A1 * | 2/2005 | Gupta et al. .................. 375/371 |
| 2010/0135378 | A1 * | 6/2010 | Lin et al. ....................... 375/233 |

* cited by examiner

*Primary Examiner* — Phuong Phu
(74) *Attorney, Agent, or Firm* — Winston Hsu; Scott Margo

(57) ABSTRACT

A timing recovery controller capable of performing timing recovery for a data sequence at twice a symbol rate includes a sampler, a timing base device, a timing error detector and a timing lock detector. The timing error detector includes a first delay unit and a second delay unit, for delaying a data sequence to output a first delay data sequence and a second delay data sequence, respectively, and a timing error calculating module, for generating a timing error value, to adjust a time base. The timing lock detector includes a third delay unit, for delaying the data sequence to output a third delay data sequence, and a timing lock determination module, for generating a timing lock determination result.

20 Claims, 11 Drawing Sheets

TIMING RECOVERY CONTROLLER AND OPERATION METHOD THEREOF

BACKGROUND OF THE INVENTION

1. Field of the Invention

The present invention relates to a timing recovery controller and operations method thereof, and more particularly to a timing recovery controller and operations method thereof capable of performing timing recovery at twice a symbol rate.

2. Description of the Prior Art

In digital communication, a transmitter sends a signal sequence carrying symbol data at a specific transmission rate. When a receiver receives the data sequence, the receiver samples the signal sequence with a sampling rate to generate a sampling sequence, so as to recover the symbol data according to a timing base. For example, if the sampling rate is 90 MB and the timing base is 2, a data sequence with a data rate of 45 MB can be acquired. The data sequence includes symbol data and transition data, and the data rate of the data sequence is twice a symbol rate of the symbol data.

However, if there is a timing error between the transmitter and the receiver, resulting from an operating frequency offset of an analog to digital converter (ADC), or a phase delay between the transmitter and the receiver, etc., the sampling rate will be inaccurate, such that the receiver cannot accurately recover the symbol data. In such a situation, the receiver needs to perform timing recovery to acquire the correct symbol data by adjusting the timing base.

In general, the receiver utilizes a timing recovery controller to perform timing recovery. The timing recovery controller includes a timing error detector and a timing lock detector. The timing error detector calculates a timing error to adjust the timing base of the receiver, so as to acquire the correct symbol data. The timing lock detector determines whether timing is locked, so as to adjust operations of the timing recovery controller; for example, the timing error detector stops operations of or reduces operating frequency, etc.

Please refer to FIG. 1, which is a schematic diagram of a conventional timing recovery controller 10. The timing recovery controller 10 includes a clock generator 102, a sampler 104, a timing base device 106, a timing error detector 108 and a timing lock detector 110. The clock generator 102 generates a sampling rate Rs, such that sampler 104 samples a signal sequence Sig_seq according to the sampling rate Rs, so as to generate a sampling sequence Sam_seq. The timing base device 106 acquires a data sequence Data_seq from the sampling sequence Sam_seq at a data rate Rd according to a timing base TB. The data sequence Data_seq includes symbol data Sym_1~Sym_n and transition data Trans_1~Trans_n, and a data rate Rd of the data sequence Data_seq is twice a symbol rate Rsb of the symbol data Sym_1~Sym_n. The timing error detector 108 receives and delays the data sequence Data_seq, and generates a timing error value TE when data of the data sequence Data_seq is any symbol data Sym_x, to adjust the timing base TB. The timing lock detector 110 receives and delays the data sequence Data_seq, and generates a timing lock determination result TL when data of the data sequence Data_seq is any symbol data Sym_y, so as to utilize a control signal Con to stop operations or reduce operating frequency of the timing error detector 108 when the timing lock determination result TL indicates timing is locked. As a result, when data of the data sequence Data_seq is symbol data, the timing recovery controller 10 can adjust the timing base TB or control operations of the timing error detector 108 according to a timing status, to perform timing recovery.

Please refer to FIG. 2A, which is an eye plot for calculating the timing error value TE of symbol data in the prior art. In FIG. 2A, symbol data Sym_a, Sym_(a-1) and transition data Trans_a in the middle are data of the data sequence Data_seq when there is timing error, while symbol data Sym_a', Sym_(a-1)' and transition data Trans_a' in the middle are data of the data sequence Data_seq when there is no timing error. In such a situation, the timing error value $TE=(Sym\_a-Sym\_(a-1)) \times Trans\_a$. The timing error value TE greater than 0 indicates the timing is leading, as shown in FIG. 2A, while the timing error value TE less than 0 indicates timing is lagging (not shown).

The structure in FIG. 2B can be derived from the above concept. FIG. 2B is a schematic diagram of the timing error detector 108 in FIG. 1. The timing error detector 108 includes delay units 202, 204, a subtractor 206, a multiplier 208 and a multiplexer 210. The subtractor 206, the multiplier 208 and the multiplexer 210 can be seen as a timing error calculating module 212, for generating the timing error value TE when data of the data sequence Data_seq is symbol data. The delay unit 202 receives and delays the data sequence Data_seq with a data cycle Td corresponding to the data rate Rd, to output a delay data sequence Delay_seq1. The delay unit 204 receives and delays the delay data sequence Delay_seq1 with the data cycle Td, to output a delay data sequence Delay_seq2. The subtractor 206 subtracts data of the delay data sequence Delay_seq2 with data of the data sequence Data_seq, to generate a subtracting result Sub1. The multiplier 208 multiplies the subtracting result Sub1 with data of the delay data sequence Delay_seq1, to generate a multiplying result Pro. The multiplexer 210 outputs the multiplying result Pro as the timing error value TE when data of the data sequence Data_seq is symbol data, to adjust the timing base TB. In other words, when data of the data sequence Data_seq is the symbol data Sym_a, data of the delay data sequence Delay_seq1 is the transition data Trans_a and data of the delay data sequence Delay_seq2 is symbol data Sym_(a-1), and thus the timing error value $TE=(Sym\_a-Sym\_(a-1)) \times Trans\_a$.

Please refer to FIG. 3A, which is a schematic diagram of calculating the timing lock determination result TL of symbol data in the prior art. In FIG. 3A, arrows Data_E indicate energy of data of the data sequence Data_seq, arrows Delay_E indicate energy of data of a delay data sequence Delay_seq3 lagging the data sequence Data_seq the data cycle Td, and arrows TL_E indicate energy of data of the data sequence Data_seq minus energy of data of the delay data sequence Delay_seq3 when data of the data sequence Data_seq is symbol data. Long arrows indicate energy of symbol data, middle arrows indicate energy of symbol data minus energy of transition data, short arrows indicate energy of transition data, and the arrows TL_E can be seen as the timing lock determination result TL corresponding to each symbol data of the data sequence Data_seq. As shown in FIG. 2A and FIG. 3A, when there is timing error, energy of transition data is not 0, and thus energy of symbol data minus energy of transition data is not equal to energy of symbol data, which indicates timing is not locked (i.e. there is timing error).

The structure in FIG. 3B can be derived from the above concept. FIG. 3B is a schematic diagram of the timing lock detector 110 in FIG. 1. The timing lock detector 110 includes a delay unit 302, a subtractor 304 and a multiplexer 306. The subtractor 304 and the multiplexer 306 can be seen as a timing lock determination module 308 for generating the timing lock determination result TL when data of the data sequence Data_seq is symbol data. The delay unit 302 receives and delays the data sequence Data_seq with the data cycle Td, to output the delay data sequence Delay_seq3. The subtractor 304 subtracts energy of data of the data sequence Data_seq with energy of data of the delay data sequence Delay_seq3, to generate a subtracting result Sub2. The multiplexer 306 outputs the subtracting result Sub2 as the timing lock determination result TL when data of the data sequence Data_seq is symbol data. The timing lock detector 110 utilizes the control signal Con to stop operations or reduce operating frequency of the timing error detector 108 when the timing lock determination result TL indicates timing is locked, i.e. the timing lock determination result TL is energy of symbol data.

However, in the prior art, the timing recovery controller 10 can only perform timing recovery when data of the data sequence Data_seq is symbol data. In other words, in the prior art, an operating rate is merely the symbol rate, which requires more time to recover timing. Thus, there is a need for improvement.

SUMMARY OF THE INVENTION

It is therefore an objective of the present invention to provide a timing recovery controller and operations method thereof capable of performing timing recovery at twice a symbol rate.

The present invention discloses a timing recovery controller capable of performing timing recovery at twice a symbol rate. The timing recovery controller includes a sampler, for sampling a signal sequence according to a sampling rate, to generate a sampling sequence; a timing base device, coupled to the sampler, for generating a data sequence according to a timing base and the sampling sequence, where the data sequence includes a plurality of symbol data and a plurality of transition data, and a data rate of the data sequence is twice the symbol rate of the plurality of symbol data; a timing error detector, capable of detecting timing error at twice the symbol rate; and a timing lock detector, capable of detecting a timing lock status at twice the symbol rate. The timing error detector includes a first delay unit, coupled to the timing base device, for receiving and delaying the data sequence with a data cycle corresponding to the data rate, to output a first delay data sequence, a second delay unit, coupled to the first delay unit, for receiving and delaying the first delaying data sequence with the data cycle, to output a second delay data sequence, and a timing error calculating module, coupled to the timing base device, the first delay unit and the second delay unit, for generating a timing error value for the plurality of symbol data and the plurality of transition data of the data sequence according to the data sequence, the first delay data sequence and the second delaying data sequence, to adjust the timing base. The timing lock detector includes a third delay unit, coupled to the timing base device, for receiving and delaying the data sequence with the data cycle, to output a third delay data sequence, and a timing lock determination module, coupled to the timing base device and the third delay unit, for generating a timing lock determination result for the plurality of symbol data and the plurality of transition data of the data sequence according to the data sequence and the third delaying data sequence.

The present invention further discloses a timing error detecting method, capable of detecting timing error for a data sequence at twice a symbol rate in a timing recovery controller, where the data sequence includes a plurality of symbol data and a plurality of transition data, and a data rate of the data sequence is twice the symbol rate of the plurality of symbol data. The timing error detecting method includes steps of receiving and delaying the data sequence with a data cycle corresponding to the data rate, to output a first delay data sequence; delaying the first delaying data sequence with the data cycle, to output a second delay data sequence; and generating a timing error value for the plurality of symbol data and the plurality of transition data of the data sequence according to the data sequence, the first delay data sequence and the second delaying data sequence, to adjust a timing base.

The present invention further discloses a timing lock detecting method, capable of detecting a timing lock status of a data sequence at twice the symbol rate in a timing recovery controller, where the data sequence comprises a plurality of symbol data and a plurality of transition data, and a data rate of the data sequence is twice the symbol rate of the plurality of symbol data. The timing lock detecting method includes steps of receiving and delaying the data sequence with a data cycle corresponding to the data rate, to output a first delay data sequence; and generating a timing lock determination result for the plurality of symbol data and the plurality of transition data of the data sequence according to the data sequence and the first delaying data sequence.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
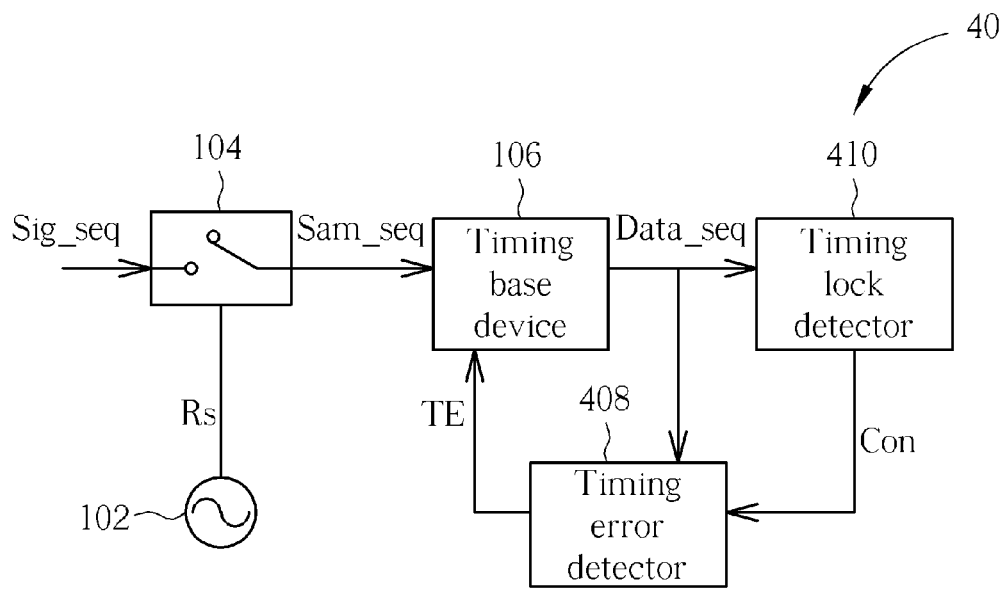
FIG. 4 is a schematic diagram of a timing recovery controller according to an embodiment of the present invention.

Please refer to FIG. 4, which is a schematic diagram of a timing recovery controller 40 according to an embodiment of the present invention. Part of the structure and operating principles of the timing recovery controller 40 are similar to those of the timing recovery controller 10, and thus elements and signals with the same functions are denoted by the same symbols for simplicity. Differences between the timing recovery controller 40 and the timing recovery controller 10 are that a timing error detector 408 and a timing lock detector 410 of the timing recovery controller 40 can generate the timing error value TE and the timing lock determination result TL, respectively, when data of the data sequence Data_seq is symbol data and transition data. In other words, the timing recovery controller 40 is capable of performing timing recovery at twice a symbol rate, i.e. data rate, so as to increase timing recovery speed.

Figure 5A:
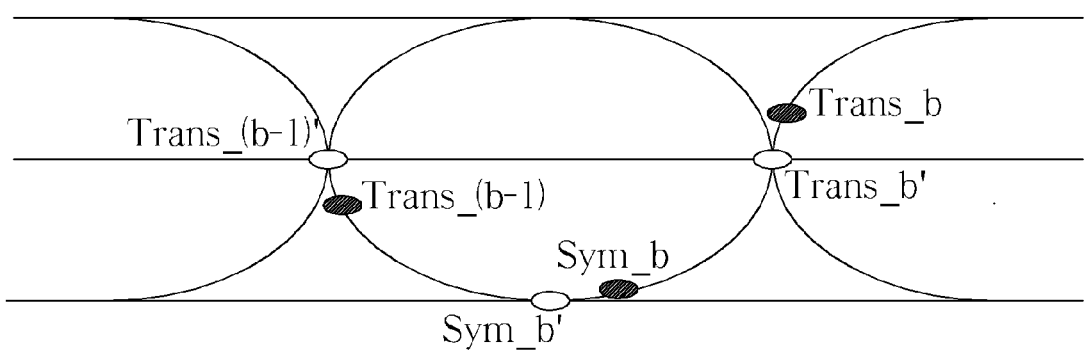
FIG. 5A is an eye plot for calculating a timing error value of transition data according to an embodiment of the present invention.

In detail, as shown in FIG. 5A, which is an eye plot for calculating the timing error value TE of transition data according to an embodiment of the present invention. In FIG. 5A, transition data Trans_b and Trans_(b-1) and symbol data Sym_b in the middle are data of the data sequence Data_seq when there is timing error, while transition data Trans_b' and Trans_(b-1)' and symbol data Sym_b' in the middle are data of the data sequence Data_seq when there is no timing error. In such a situation, the timing error value TE=−(Trans_b-Trans_(b-1))×Sym_b. The timing error value TE greater than 0 indicates the timing is leading, as shown in FIG. 5A, while the timing error value TE less than 0 indicates timing is lagging (not shown).

Figure 1:
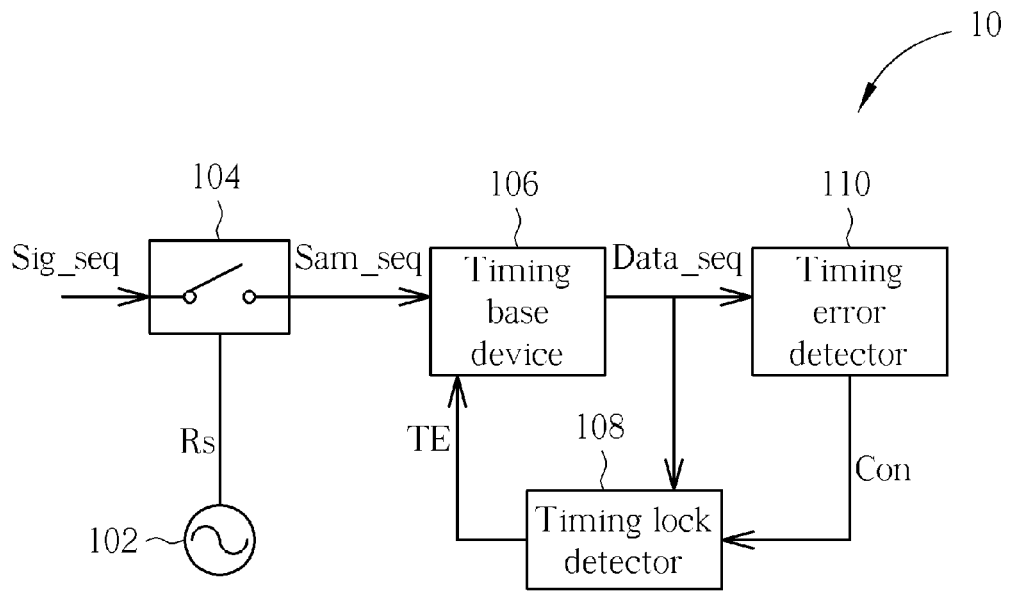
FIG. 1 is a schematic diagram of a conventional timing recovery controller.
Figure 2A:
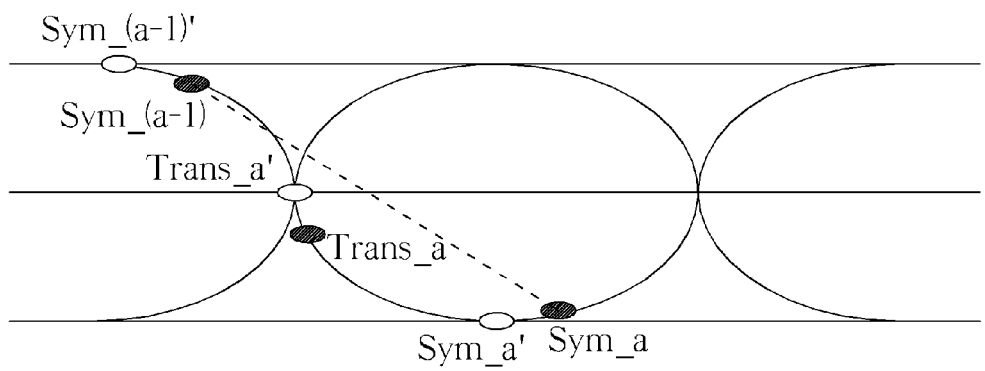
FIG. 2A is an eye plot for calculating a timing error value of symbol data in the prior art.
Figure 5B:
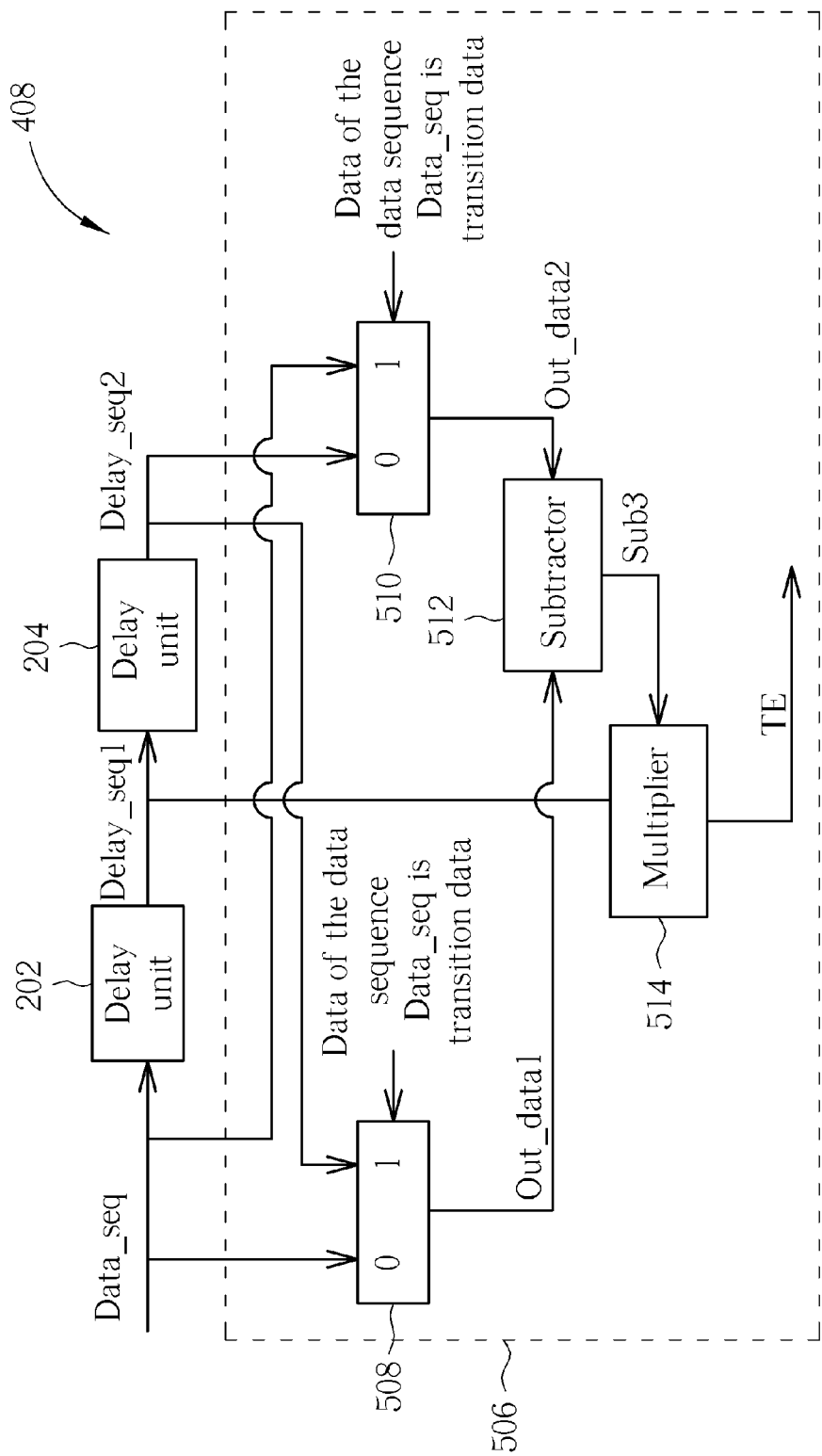
FIG. 5B is a schematic diagram of a timing error detector in FIG. 4.

The structure in FIG. 5B can be derived from the concept of FIG. 2A and FIG. 5A. FIG. 5B is a schematic diagram of the timing error detector 408 in FIG. 4. Differences between the timing error detector 408 and the timing error detector 108 are that the timing error detector 408 includes a timing error calculating module 506 capable of generating the timing error value TE when data of the data sequence Data_seq is transition data. The timing error calculating module 506 includes multiplexers 508, 510, a subtractor 512 and a multiplier 514. When data of the data sequence Data_seq is symbol data, the multiplexers 508, 510 output data of the data sequence Data_seq and data of the delay data sequence Delay_seq2 as output data Out_data1, Out_data2, respectively; and when data of the data sequence Data_seq is transition data, the multiplexers 508, 510 output data of the delay data sequence Delay_seq2 and data of the data sequence Data_seq as the output data Out_data1, Out_data2, respectively. The subtractor 512 subtracts the output data Out_data1 with the output data Out_data2, to generate a subtracting result Sub3. The multiplier 514 multiplies the subtracting result Sub3 with data of the delay data sequence Delay_seq1, to generate the timing error value TE, for adjusting the timing base TB. In such a situation, when data of the data sequence Data_seq is the transition data Trans_b, data of the delay data sequence Delay_seq1 is symbol data Sym_b and data of the delay data sequence Delay_seq2 is transition data Trans_(b-1). Therefore, the output data Out_data1, Out_data2 are the transition data Trans_(b-1), Trans_b, respectively, and thus the timing error value TE=−(Trans_b-Trans_(b-1))×Sym_b. Similarly, when data of the data sequence Data_seq is the symbol data Sym_a, the timing error value TE=(Sym_a-Sym_(a-1))×Trans_a. As a result, the timing error detector 408 can detect timing error at twice the symbol rate, i.e. the data rate, to adjust the timing base TB, so as to increase timing recovery speed.

Figure 3A:
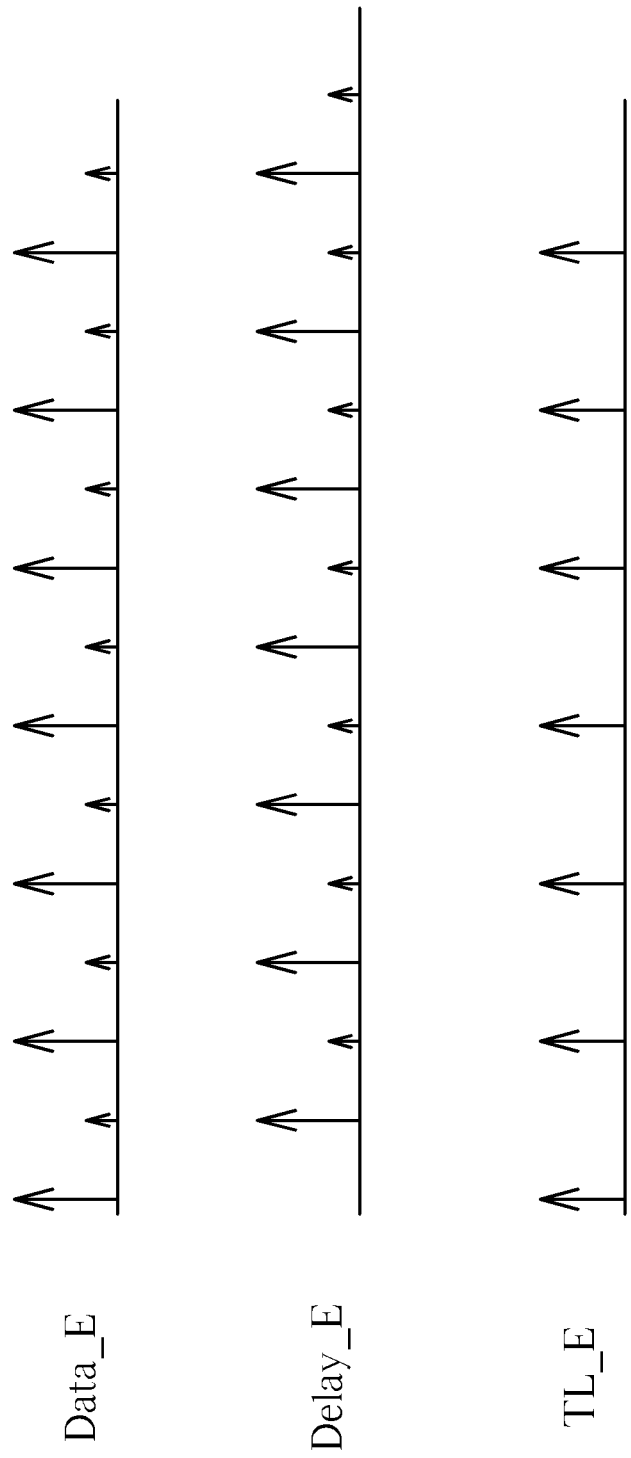
FIG. 3A is a schematic diagram of calculating a timing lock determination result of symbol data in the prior art.
Figure 6A:
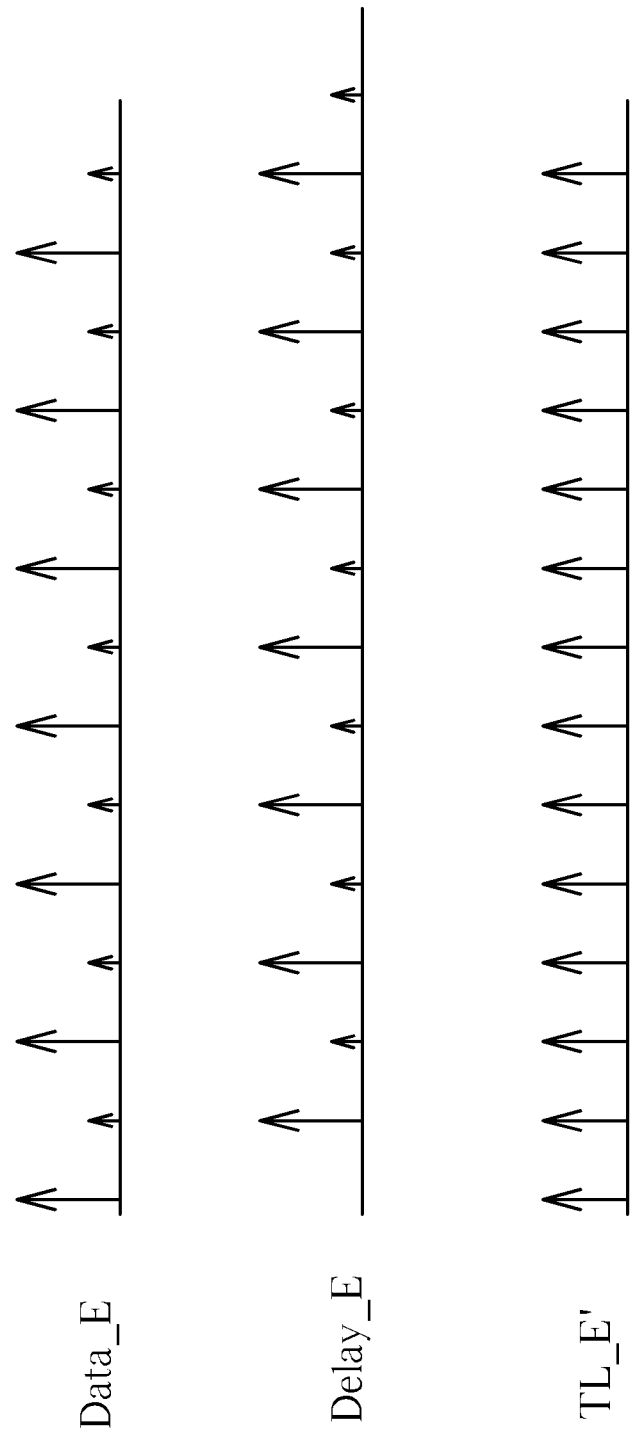
FIG. 6A is a schematic diagram of calculating a timing lock determination result according to an embodiment of the present invention.

On the other hand, please refer to FIG. 6A, which is a schematic diagram of calculating the timing lock determination result TL according to an embodiment of the present invention. FIG. 6A is similar to FIG. 3A. Differences between FIG. 6A and FIG. 3A are that the arrows TL_E' indicate energy of data of the data sequence Data_seq minus energy of data of the delay data sequence Delay_seq3 when data of the data sequence Data_seq is symbol data, and energy of data of the delay data sequence Delay_seq3 minus energy of data of the data sequence Data_seq when data of the data sequence Data_seq is transition data. As shown in FIG. 3A and FIG. 6A, when there is timing error, energy of transition data is not 0, and thus energy of symbol data minus energy of transition data is not equal to energy of symbol data, which indicates timing is not locked (timing error).

Figure 2B:
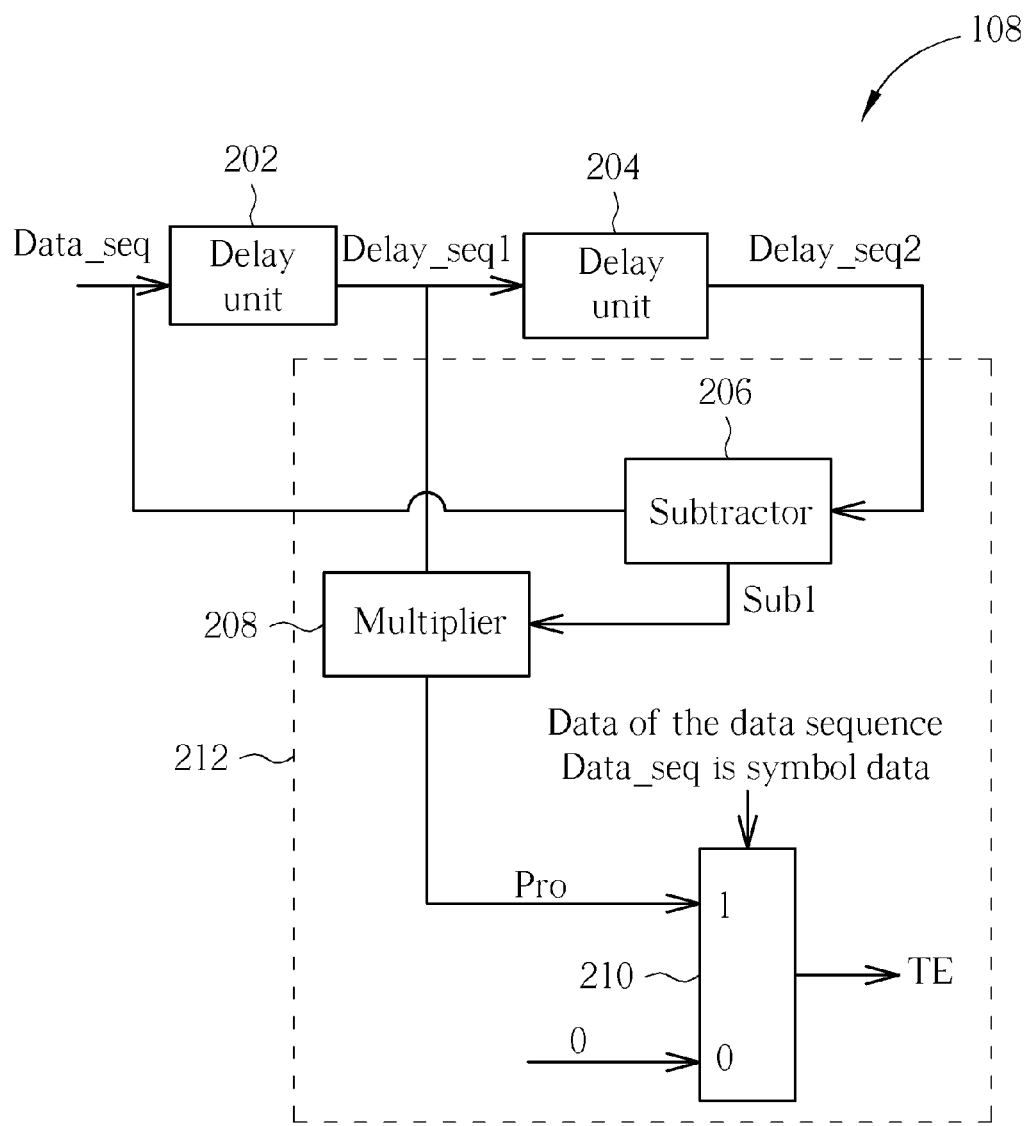
FIG. 2B is a schematic diagram of a timing error detector in FIG. 1.
Figure 3B:
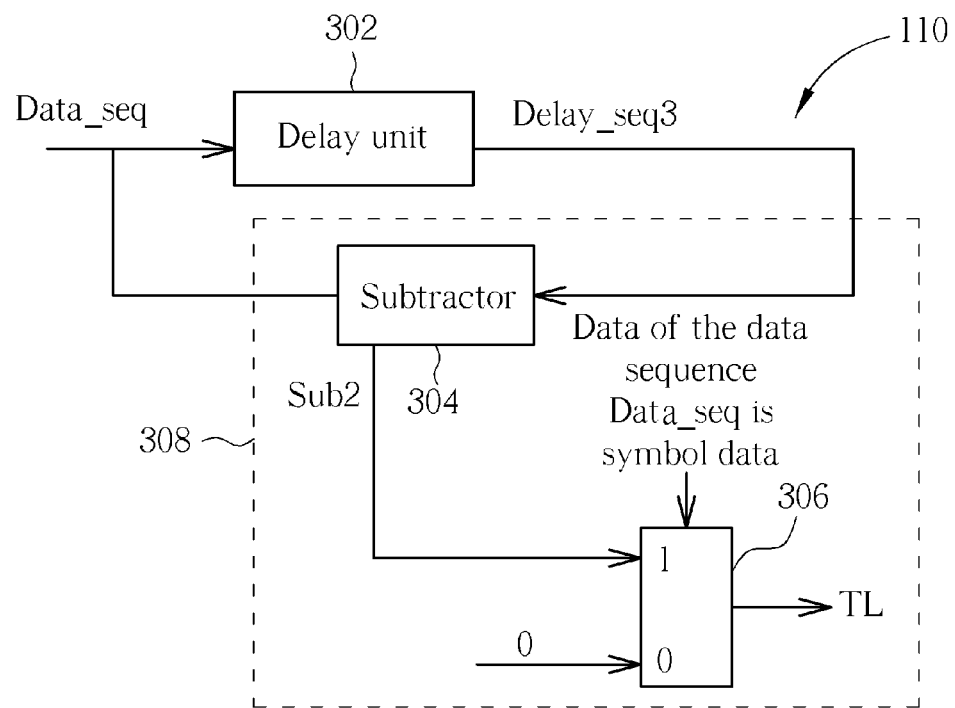
FIG. 3B is a schematic diagram of a timing lock detector in FIG. 1.
Figure 6B:
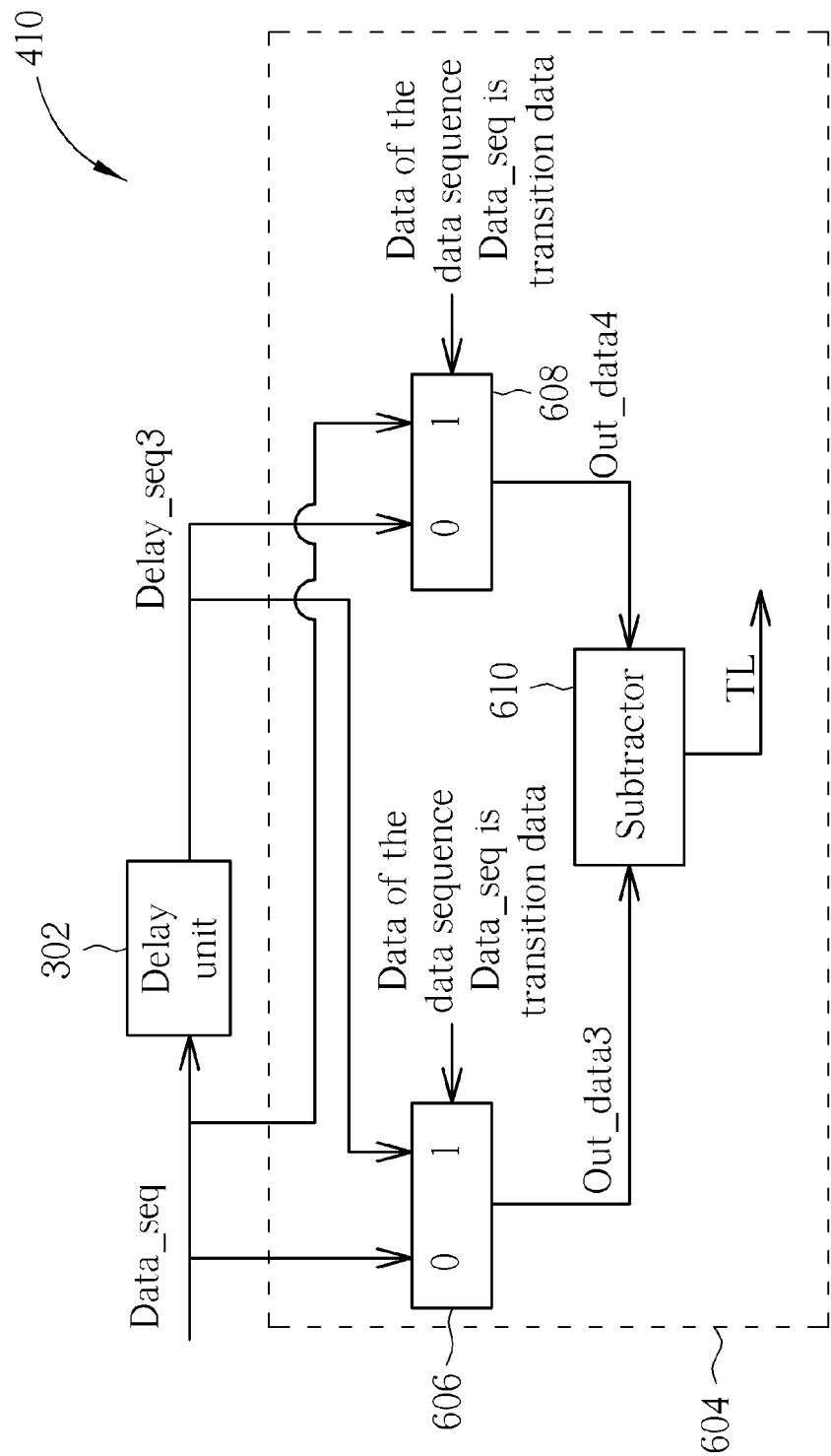
FIG. 6B is a schematic diagram of a timing lock detector in FIG. 4.

The structure in FIG. 6B can be derived from the above concept. FIB. 6B is a schematic diagram of the timing lock detector 410 in FIG. 4. Differences between the timing lock detector 410 and the timing lock detector 110 are that the timing lock detector 410 includes a timing lock determination module 604 capable of generating the timing lock determination result TL when data of the data sequence Data_seq is transition data. The timing lock determination module 604 includes multiplexers 606, 608 and a subtractor 610. When data of the data sequence Data_seq is symbol data, the multiplexers 606, 608 output data of the data sequence Data_seq and data of the delay data sequence Delay_seq3 as output data Out_data3, Out_data4, respectively; and when data of the data sequence Data_seq is transition data, the multiplexers 606, 608 output data of the delay data sequence Delay_seq3 and data of the data sequence Data_seq as output data Out_data3, Out_data4, respectively. The subtractor 610 subtracts the output data Out_data3 with the output data Out_data4, to generate the timing lock determination result TL. Noticeably, the subtractor 304 and the subtractor 610 in FIG. 3B and FIG. 3B operate with energy of data (scalar quantities), while the subtractor 206 and the subtractor 512 FIG. 2B and FIG. 5B operate with data (rector quantities). As a result, the timing error detector 410 can detect a timing lock status at twice the symbol rate, i.e. data rate, and utilizes the control signal Con to stop operations or reduce operating frequency of the timing error detector 408 when the timing lock determination result TL indicates timing is locked.

Figure 7:
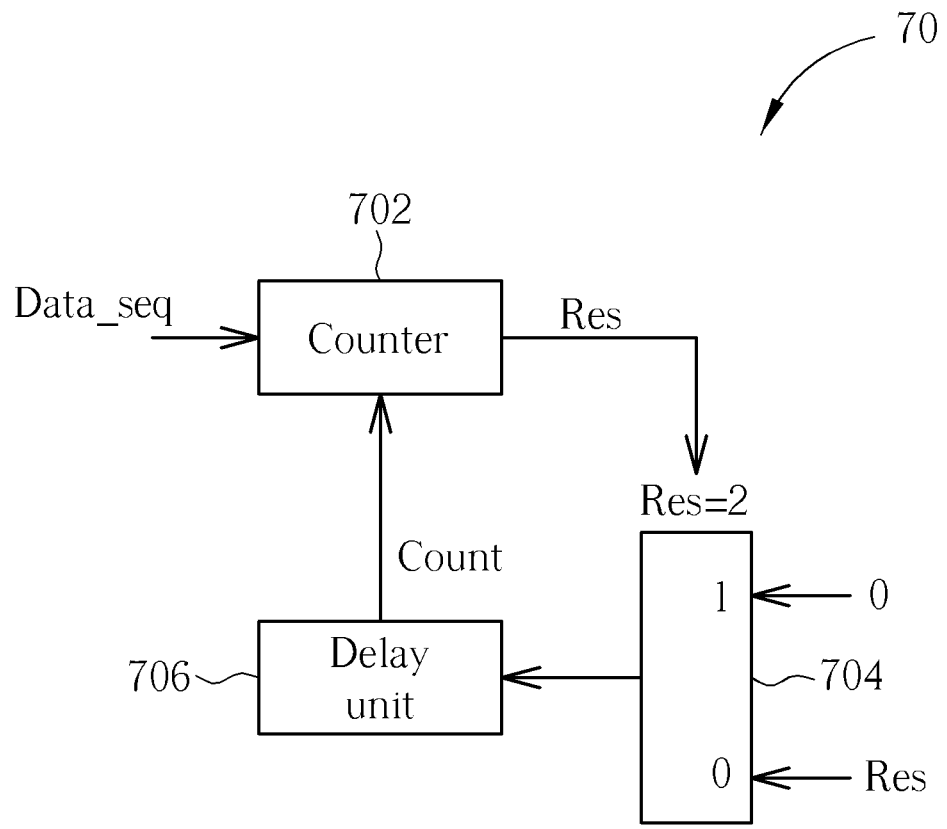
FIG. 7 is a schematic diagram of a data determination element according to an embodiment of the present invention.

In addition, determining data of the data sequence Data_seq is symbol data or transition data in FIG. 2B, FIG. 3B, FIG. 5B and FIG. 6B can be realized by a data determination element 70 shown in FIG. 7. The data determination element 70 includes a counter 702, a multiplexer 704, and a delay unit 706. The counter 702 adds a delaying count Count with 1, to generate a count result Res when receiving data of the data sequence Data_seq. The multiplexer 704 outputs 0 as an output count value Output if the count result Res is 2, and outputs the outputs count result Res as the output count value Output if the count result Res is not 2. The delay unit 706 delays the output count value Output with the data cycle Td, to output the delaying count Count. An initial value of the delaying count Count is 0, and first data of the data sequence Data_seq is symbol data. As a result, the data determination element 70 can determine data of the data sequence Data_seq is symbol data when the delaying count Count is 0, and data of the data sequence Data_seq is transition data when the delaying count Count is 1.

Noticeably, the above description is only utilized for illustrating the concept of the present invention. The spirit of the present invention is to detect a timing error value and a timing lock status of transition data in the middle of symbol data, to detect the timing error value and a timing lock status at twice the symbol rate, so as to increase timing recovery speed. Those skilled in the art should make modifications or alterations according to the spirit of the present invention. For example, the timing error calculating module 506 and the timing lock determination module 604 are not limited to the structures shown in FIG. 5B and FIB. 6B, as long as the timing error value TE and the timing lock determination result TL can be generated when data of the data sequence Data_seq is transition data. Furthermore, only one component of data is shown in FIG. 2A and FIG. 5A, such as in-phase (I) component or quadrature-phase (Q) component.

Practically, each component of data needs to be calculated to acquire the timing error value TE. Moreover, when there is no timing error, transition data may not be 0, which should depend on transition between symbol data. For example, symbol data transit between 1 and −1 in FIG. 2A and FIG. 5A, and may transit between 0 and 1 or 0 and −1 as well, where calculation of the timing error value TE=(Sym_a-Sym_(a-1))×Trans_a and the timing error value TE=−(Trans_b-Trans_(b-1))×Sym_b can be applied to all kinds of transitions between symbol data, while the timing lock determination result TL should depend on transition between symbol data, to change a specific value for determination, i.e. energy of symbol data minus energy of transition data in ideal, to determining whether timing is locked. In addition, the data determination element 70 in FIG. 7 can be other structures as well, as long as data of the data sequence Data_seq can be determined as symbol data or transition data.

Figure 8:
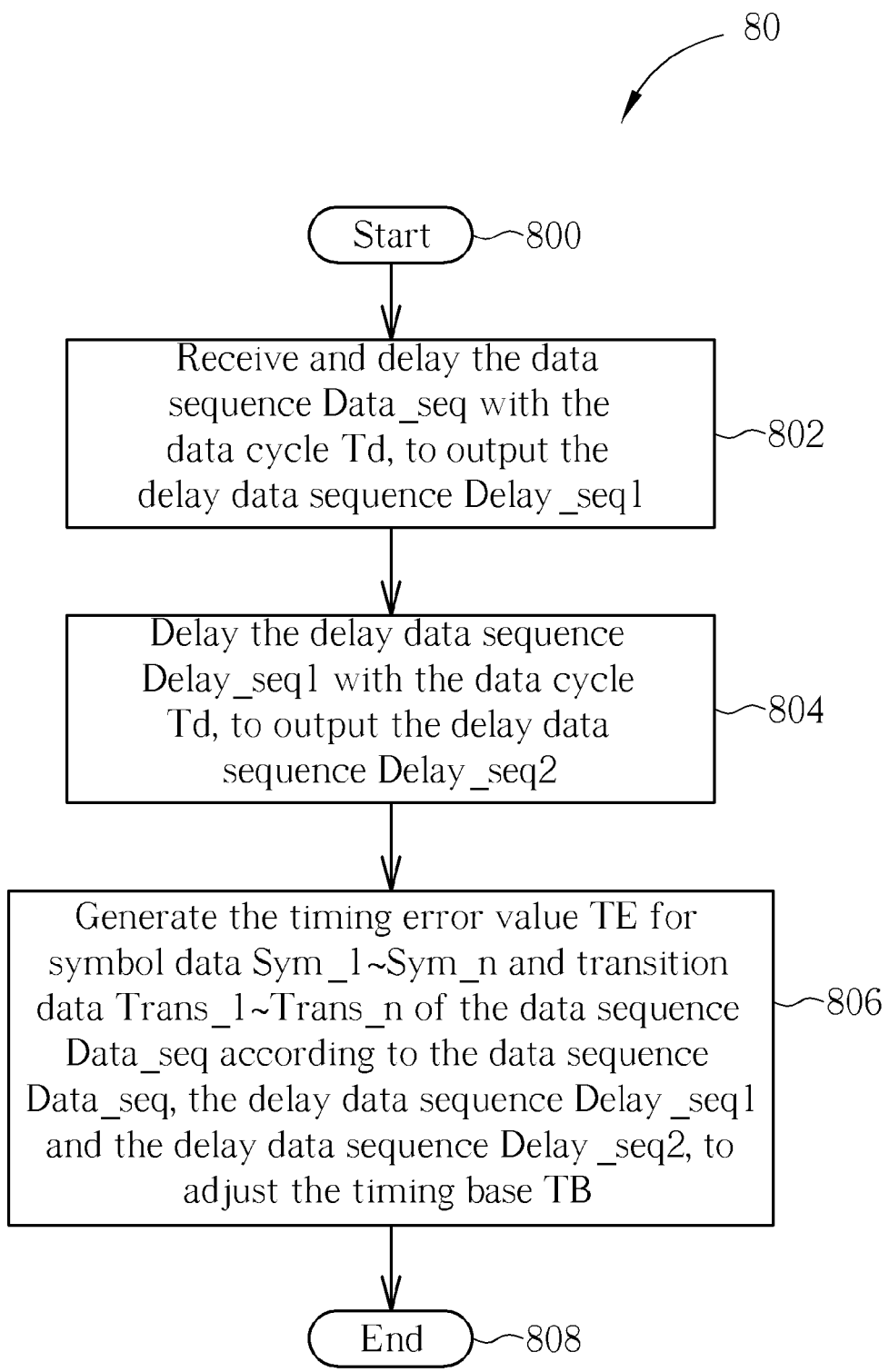
FIG. 8 is a schematic diagram of a timing error detecting process according to an embodiment of the present invention.

Operations of the timing error detector 408 can be summarized into a timing error detecting process 80 as shown in FIG. 8. The timing error detecting process 80 includes the following steps:

Step 800: Start.

Step 802: Receive and delay the data sequence Data_seq with the data cycle Td, to output the delay data sequence Delay_seq1.

Step 804: Delay the delay data sequence Delay_seq1 with the data cycle Td, to output the delay data sequence Delay_seq2.

Step 806: Generate the timing error value TE for symbol data Sym_1~Sym_n and transition data Trans_1~Trans_n of the data sequence Data_seq according to the data sequence Data_seq, the delay data sequence Delay_seq1 and the delay data sequence Delay_seq2, to adjust the timing base TB.

Step 808: End.

Detailed operations of the timing error detecting process 80 can be referred to the above description, and are not narrated hereinafter.

Figure 9:
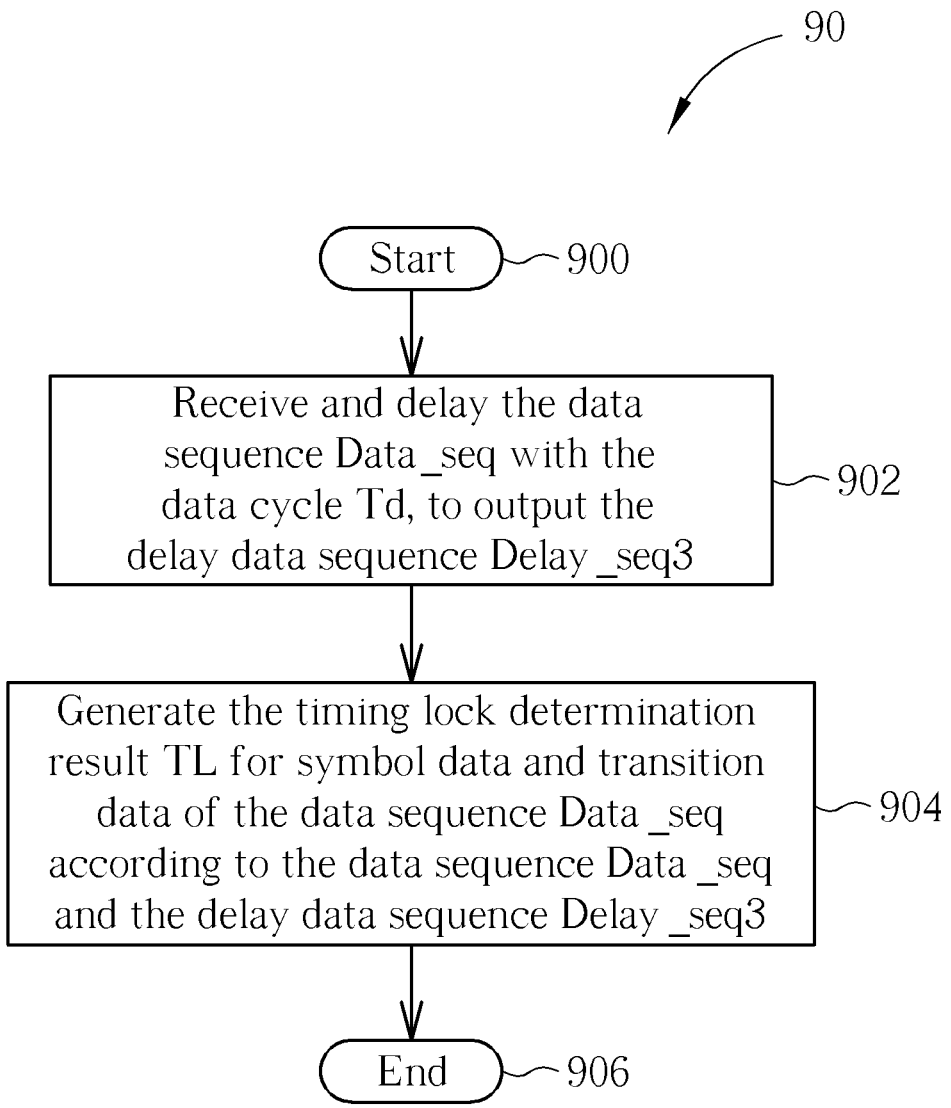
FIG. 9 is a schematic diagram of a timing lock detecting process according to an embodiment of the present invention.

Operations of the timing lock detector 410 can be summarized into a timing lock detecting process 90 as shown in FIG. 9. The timing lock detecting process 90 includes the following steps:

Step 900: Start.

Step 902: Receive and delay the data sequence Data_seq with the data cycle Td, to output the delay data sequence Delay_seq3.

Step 904: Generate the timing lock determination result TL for symbol data and transition data of the data sequence Data_seq according to the data sequence Data_seq and the delay data sequence Delay_seq3.

Step 906: End.

Detailed operations of the timing lock detecting process 90 can be referred to the above description, and are not narrated hereinafter.

In the prior art, the timing recovery controller can only perform timing recovery when data of the data sequence is symbol data. In other words, the operating rate is merely the symbol rate in the prior art, which requires more time to recover timing. In comparison, the present invention modifies circuit structures, and thus can detect the timing error value and the timing lock status when data of the data sequence is transition data in the middle of symbol data, to detect the timing error and the timing lock status at twice the symbol rate, so as to increase timing recovery speed.

To sum up, the present invention can detect the timing error value and the timing lock status at twice the symbol rate, so as to increase timing recovery speed significantly.

Those skilled in the art will readily observe that numerous modifications and alterations of the device and method may be made while retaining the teachings of the invention.

What is claimed is:

1. A timing recovery controller capable of performing timing recovery at twice a symbol rate, comprising:
 a sampler, for sampling a signal sequence according to a sampling rate, to generate a sampling sequence;
 a timing base device, coupled to the sampler, for generating a data sequence according to a timing base and the sampling sequence, the data sequence comprising a plurality of symbol data and a plurality of transition data, where a data rate of the data sequence is twice the symbol rate of the plurality of symbol data;
 a timing error detector, capable of detecting timing error at twice the symbol rate, comprising:
  a first delay unit, coupled to the timing base device, for receiving and delaying the data sequence with a data cycle corresponding to the data rate, to output a first delay data sequence;
  a second delay unit, coupled to the first delay unit, for receiving and delaying the first delaying data sequence with the data cycle, to output a second delay data sequence; and
  a timing error calculating module, coupled to the timing base device, the first delay unit and the second delay unit, for generating a timing error value when data of the data sequence is symbol data and transition data according to the data sequence, the first delay data sequence and the second delaying data sequence, to adjust the timing base; and
 a timing lock detector, capable of detecting a timing lock status at twice the symbol rate, comprising:
  a third delay unit, coupled to the timing base device, for receiving and delaying the data sequence with the data cycle, to output a third delay data sequence; and
  a timing lock determination module, coupled to the timing base device and the third delay unit, for generating a timing lock determination result when data of the data sequence is symbol data and transition data according to the data sequence and the third delaying data sequence.

2. The timing recovery controller of claim 1, wherein the timing error calculating module further comprises;
 a first multiplexer, coupled to the timing base device and the second delay unit, for outputting a first output data according to a type of the data sequence;
 a second multiplexer, coupled to the timing base device and the second delay unit, for outputting a second output data according to the type of the data sequence;
 a first subtractor, coupled to the first multiplexer and the second multiplexer, for subtracting the first output data with the second output data, to generate a subtracting result; and
 a multiplier, coupled to the first delay unit and the subtractor, for multiplying the first delay data sequence with the subtracting result, to generate the timing error value.

3. The timing recovery controller of claim 2, wherein the first multiplexer outputs the data sequence as the first output data and the second multiplexer outputs the data of the second delay data sequence as the second output data when the data sequence is the symbol data, and the first multiplexer outputs the data of the second delay data sequence as the first output data and the second multiplexer outputs the data sequence as the second output data when the data sequence is the transition data.

4. The timing recovery controller of claim 1, wherein the timing lock determination module further comprises;
   a first multiplexer, coupled to the timing base device and the third delay unit, for outputting a first output data according to a type of the data sequence;
   a second multiplexer, coupled to the timing base device and the third delay unit, for outputting a second output data according to the type of the data sequence; and
   a determination element, coupled to the first multiplexer and the second multiplexer, for subtracting the first output data with the second output data, to generate the timing lock determination result.

5. The timing recovery controller of claim 4, wherein the first multiplexer outputs the data sequence as the first output data and the second multiplexer outputs data of the third delay data sequence as a second output data when the data sequence is the symbol data, and the first multiplexer outputs the data of the third delay data sequence as the first output data and the second multiplexer outputs the data sequence as the second output data when the data sequence is the transition data.

6. The timing recovery controller of claim 1, wherein the timing recovery controller further comprises a data determination element, for determining a type of the data sequence, and the data determination element comprises;
   a counter, for adding a delaying count with a count value when receiving the data sequence, to generate a count result;
   a third multiplexer, coupled to the counter, for outputting a second specific value as an output count value when the count result is a first specific value, and outputting the count result as the output count value when the count result is not the first specific value; and
   a fourth delay unit, coupled to the counter and the third multiplexer, for receiving and delaying the output count value with the data cycle, to output the delaying count;
   wherein the data sequence is determined as the symbol data when the delaying count is the second specific value, and the data sequence is determined as the transition data when the delaying count is a third specific value.

7. The timing recovery controller of claim 6, wherein an initial value of the delaying count is 0, and the first specific value, the second specific value and the third specific value are respectively 2, 0 and 1.

8. The timing recovery controller of claim 4, wherein the timing lock determination result indicates timing is locked when the timing lock determination result is a specific value.

9. The timing recovery controller of claim 1, wherein the timing error detector stops operations or reduces operating frequency when the timing lock determination result indicates timing is locked.

10. A timing error detecting method, capable of detecting timing error for a data sequence at twice a symbol rate in a timing recovery controller, where the data sequence comprises a plurality of symbol data and a plurality of transition data, and a data rate of the data sequence is twice the symbol rate of the plurality of symbol data, the timing error detecting method comprising steps of:
   receiving and delaying the data sequence with a data cycle corresponding to the data rate, to output a first delay data sequence;
   delaying the first delaying data sequence with the data cycle, to output a second delay data sequence; and
   generating a timing error value when data of the data sequence is symbol data and transition data according to the data sequence, the first delay data sequence and the second delaying data sequence, to adjust a timing base.

11. The timing error detecting method of claim 10, wherein generating the timing error value for the plurality of symbol data and the plurality of transition data of the data sequence according to the data sequence, the first delay data sequence and the second delaying data sequence, to adjust the timing base further comprises steps of;
   outputting a first output data and a second output data according to a type of the data sequence;
   subtracting the first output data with the second output data, to generate a subtracting result; and
   multiplying the first delay data sequence with the subtracting result, to generate the timing error value.

12. The timing error detecting method of claim 11, wherein outputting the first output data and the second output data according to the type of the data sequence further comprises steps of:
   outputting the data sequence as the first output data and the second delay data sequence as the second output data when determining the data sequence is the symbol data.

13. The timing error detecting method of claim 11, wherein outputting the first output data and the second output data according to the type of the data sequence further comprises steps of:
   outputting data of the second delay data sequence as the first output data and the data sequence as the second output data when determining the data sequence is the transition data.

14. The timing error detecting method of claim 11, wherein outputting the first output data and the second output data according to the type of the data sequence further comprises steps of:
   adding a delaying count with a count value when receiving the data sequence, to generate a count result;
   outputting a second specific value as an output count value when the count result is a first specific value, and outputting the count result as the output count value when the count result is not the first specific value;
   delaying the output count value with the data cycle, to output the delaying count; and
   determining the data sequence is the symbol data when the delaying count is the second specific value, and the determining the data sequence is the transition data when the delaying count is a third specific value.

15. The timing error detecting method of claim 14, wherein an initial value of the delaying count is 0, and the first specific value, the second specific value and the third specific value are respectively 2, 0 and 1.

16. A timing lock detecting method, capable of detecting a timing lock status of a data sequence at twice the symbol rate in a timing recovery controller, where the data sequence comprises a plurality of symbol data and a plurality of transition data, and a data rate of the data sequence is twice the symbol rate of the plurality of symbol data, the timing lock detecting method comprising steps of:
   receiving and delaying the data sequence with a data cycle corresponding to the data rate, to output a first delay data sequence; and
   generating a timing lock determination result when data of the data sequence is symbol data and transition data according to the data sequence and the first delaying data sequence.

17. The timing lock detecting method of claim 16, wherein generating the timing lock determination result for the plurality of symbol data and the plurality of transition data of the data sequence according to the data sequence and the first delaying data sequence further comprises steps of;

outputting a first output data and a second output data according to a type of the data sequence; and subtracting the first output data with the second output data, to generate the timing lock determination result.

18. The timing lock detecting method of claim 17, wherein outputting the first output data and the second output data according to the type of the data sequence further comprises steps of:

outputting the data sequence as the first output data and the first delay data sequence as the second output data when determining the data sequence is the symbol data.

19. The timing lock detecting method of claim 17, wherein outputting the first output data and the second output data according to the type of the data sequence further comprises steps of:

outputting the second delay data sequence as the first output data and the data sequence as the first output data when determining the data sequence is the transition data.

20. The timing lock detecting method of claim 17, wherein outputting the first output data and the second output data according to the type of the data sequence further comprises steps of:

adding a delaying count with a count value when receiving the data sequence, to generate a count result;

outputting a second specific value as an output count value when the count result is a first specific value, and outputting the count result as the output count value when the count result is not the first specific value;

delaying the output count value with the data cycle, to output the delaying count; and determining the data sequence is the symbol data when the delaying count is the second specific value, and the determining the data sequence is the transition data when the delaying count is a third specific value.

\* \* \* \* \*